US012603328B2

(12) United States Patent
Hara

(10) Patent No.: US 12,603,328 B2
(45) Date of Patent: Apr. 14, 2026

(54) METHOD FOR MANUFACTURING SECONDARY BATTERY

(71) Applicant: Prime Planet Energy & Solutions, Inc., Tokyo (JP)

(72) Inventor: Takeru Hara, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 733 days.

(21) Appl. No.: 17/690,010

(22) Filed: Mar. 9, 2022

(65) Prior Publication Data

US 2022/0294023 A1     Sep. 15, 2022

(30) Foreign Application Priority Data

Mar. 12, 2021    (JP) ................................. 2021-039917

(51) Int. Cl.
H01M 10/058 (2010.01)
H01M 10/0525 (2010.01)
H01M 10/0587 (2010.01)

(52) U.S. Cl.
CPC .............................. H01M 10/0587 (2013.01)

(58) Field of Classification Search
CPC . H01M 10/0587; H01M 10/058; H01M 10/05
See application file for complete search history.

(56) References Cited

U.S. PATENT DOCUMENTS

| | | | | | |
|---|---|---|---|---|---|
| 2010/0255371 A1* | 10/2010 | Takayama | ............... | H01M 4/13 | |
| | | | | 156/182 | |
| 2015/0140361 A1* | 5/2015 | Abe | .................. | H01M 10/4257 | |
| | | | | 429/7 | |
| 2016/0380307 A1* | 12/2016 | Akita | ................ | H01M 10/0525 | |
| | | | | 429/144 | |

FOREIGN PATENT DOCUMENTS

| | | | |
|---|---|---|---|
| CN | 208400970 U | | 1/2019 |
| JP | 2002-42775 A | | 2/2002 |
| JP | 2002042775 | * | 2/2002 |
| JP | 2006-127824 A | | 5/2006 |
| JP | 2007-5069 A | | 1/2007 |
| JP | 2007005069 | * | 1/2007 |
| JP | 2007005069 A | * | 1/2007 |
| JP | 2013149400 A | | 8/2013 |

(Continued)

OTHER PUBLICATIONS

JP2007005069A_Description_Translated (Year: 2007).*
JP2007005069A_Claims_Translated (Year: 2007).*
JP2014220109A_Description_Translated (Year: 2014).*
JP-2014220109-A Translate (Year: 2014).*
JP-2007005069-A Translate (Year: 2007).*
"What is Cricut EasyPress?', Aug. 4, 2020, Cricut" (Year: 2020).*

*Primary Examiner* — Matthew T Martin
*Assistant Examiner* — Kevin Song
(74) *Attorney, Agent, or Firm* — HAUPTMAN HAM, LLP

(57) ABSTRACT

Provided is a technique capable of suppressing the occurrence of uneven drying inside an electrode body. The manufacturing method disclosed herein is for manufacturing a secondary battery comprising an electrode body and a battery case. The method comprises the steps of: accommodating the electrode body in the battery case to produce a battery assembly; arranging a gripping tool on the outside of the battery case of the battery assembly and gripping the battery assembly with the gripping tool; and drying the inside of the battery assembly, wherein the battery assembly is gripped and heated. In the gripping, a larger restraining pressure is applied to a central region of a rectangular surface of the electrode body than to other regions.

10 Claims, 4 Drawing Sheets

(56)          References Cited

FOREIGN PATENT DOCUMENTS

| | | | |
|---|---|---|---|
| JP | 2013-187086 | A | 9/2013 |
| JP | 2014220109 | * | 11/2014 |
| JP | 2014220109 | A  * | 11/2014 |
| JP | 2016-81758 | A | 5/2016 |
| JP | 20186261 | A | 1/2018 |
| WO | 2016059464 | A1 | 4/2016 |

* cited by examiner

METHOD FOR MANUFACTURING SECONDARY BATTERY

CROSS REFERENCE TO RELATED APPLICATIONS

This application claims priority based on Japanese Patent Application No. 2021-039917 filed on Mar. 12, 2021, and the entire contents of the application are incorporated herein by reference.

BACKGROUND OF THE DISCLOSURE

1. Technical Field

The present invention relates to a method for manufacturing a secondary battery.

2. Background

Currently, secondary batteries such as lithium ion secondary batteries and nickel-hydrogen batteries are widely used in various fields such as vehicles and mobile terminals. A typical example of this kind of secondary battery is configured to include an electrode body provided with a positive electrode, a negative electrode, and a separator that separates the positive electrode and the negative electrode, and a battery case that accommodates the electrode body.

Japanese Patent Application Publication No. 2018-6261 describes an example of a method for manufacturing a secondary battery having such a configuration. The patent document describes a step of drying the inside of a battery assembly in a state where an electrode body is accommodated in a battery case and an electrolytic solution is not injected. The manufacturing method disclosed in the patent document includes: an arrangement step of arranging a battery assembly in a state where an electrode body is accommodated in a battery case in a vacuum drying furnace; a drying step of raising the temperature and reducing the pressure inside the vacuum drying furnace to dry the battery assembly; and a pressurizing step of increasing the pressure inside the vacuum drying furnace after the battery assembly is dried.

SUMMARY OF THE INVENTION

However, where the inside of the electrode body is unevenly dried in the drying of the battery assembly as described above, it may cause undesirable unevenness in current distribution and potential distribution.

The present invention has been created to solve such a problem, and an object of the present invention is to provide a technique capable of suppressing the occurrence of uneven drying inside an electrode body.

Disclosed herein is a method for manufacturing a secondary battery including an electrode body provided with a positive electrode, a negative electrode, and a separator that separates the positive electrode and the negative electrode and having at least a pair of rectangular surfaces, and a battery case that accommodates the electrode body. The manufacturing method comprises the steps of: accommodating the electrode body in the battery case to produce a battery assembly; arranging a gripping tool on the outside of the battery case of the battery assembly and gripping the battery assembly with the gripping tool, wherein the battery case comprises two facing surfaces facing the pair of rectangular surfaces of the electrode body accommodated inside the case, and the two facing surfaces of the battery case are sandwiched with the gripping tool; and drying the inside of the battery assembly, wherein the battery assembly is gripped and heated. Here, in the gripping, a larger restraining pressure is applied to a central region including a center line in a long side direction of the rectangular surface of the electrode body than in other regions of the rectangular surface excluding the central region.

In the manufacturing method having such a configuration, the battery assembly is dried while applying a larger restraining pressure to the central region of the electrode body than in other regions. As a result, it is possible to promote the removal of moisture from the central region and suppress the occurrence of uneven drying inside the electrode body.

In a preferred embodiment of the manufacturing method disclosed herein, the ratio (L2/L1) of the length L2 in the long side direction of the central region to the length L1 in the long side direction of the rectangular surface of the electrode body is ⅛ or more and ½ or less. In a configuration in which the ratio (L2/L1) is set to be within the above range, the effects of the technique disclosed herein can be adequately realized.

In another preferred embodiment of the manufacturing method disclosed herein, the length L1 is 100 mm or more. The effect of the technique disclosed herein can be preferably exerted when drying a battery assembly having an electrode body with a length L1 of 100 mm or more.

In another preferred embodiment of the manufacturing method disclosed herein, the positive electrode is a long strip-shaped positive electrode sheet, and the negative electrode is a long strip-shaped negative electrode sheet. The electrode body is a wound electrode body in which the positive electrode sheet and the negative electrode sheet are laminated with the separator interposed therebetween and are wound around a winding axis orthogonal to the longitudinal direction of the sheets. Here, the laminated surfaces of the positive electrode sheet, the negative electrode sheet, and the separator are open to the outside of the electrode body from both ends in the winding axis direction. In the drying of the wound electrode body having the above configuration, the moisture in the electrode body goes out from the open laminated surface, so that uneven drying is likely to occur in the wound electrode body. The effect of the technique disclosed herein can be preferably exerted when the battery assembly having the wound electrode body is dried.

In another preferred embodiment of the manufacturing method disclosed herein, the gripping tool is in contact with the battery case in a region facing the central region and is not in contact with the battery case in a region facing the other regions. With such a configuration, the removal of moisture from the central region can be promoted more selectively.

In another preferred embodiment of the manufacturing method disclosed herein, a heating element is mounted on the gripping tool. With such a configuration, the above effect can be more preferably realized.

DETAILED DESCRIPTION OF THE PREFERRED EMBODIMENTS

Hereinafter, some preferred embodiments of the technique disclosed herein will be described with reference to the drawings. It should be noted that matters other than those specifically mentioned in the present description and necessary for carrying out the present invention (for example, general configuration and manufacturing process of the secondary battery that do not characterize the technique disclosed herein) can be ascertained as design matters for a person skilled in the art that are based on the related art in the field. The technique disclosed herein can be implemented based on the contents disclosed in the present description and the common technical knowledge in the art.

In the present description, the "secondary battery" is a term that refers to a general power storage device capable of repeatedly charging and discharging, and is a concept inclusive of a so-called storage battery (chemical battery) such as a lithium ion secondary battery or a nickel hydrogen battery, and a capacitor (physical battery) such as an electric double layer capacitor.

In each figure referred to in the present description, reference symbol X indicates a "depth direction", reference symbol Y indicates a "width direction", and reference symbol Z indicates a "height direction". Further, F in the depth direction X indicates "front" and Rr indicates "rear". L in the width direction Y indicates "left" and R indicates "right". Then, U in the height direction Z indicates "upper" and D indicates "lower". However, these are merely directions for convenience of explanation, and do not limit in any way the installation form of the secondary battery.

Figure 1:
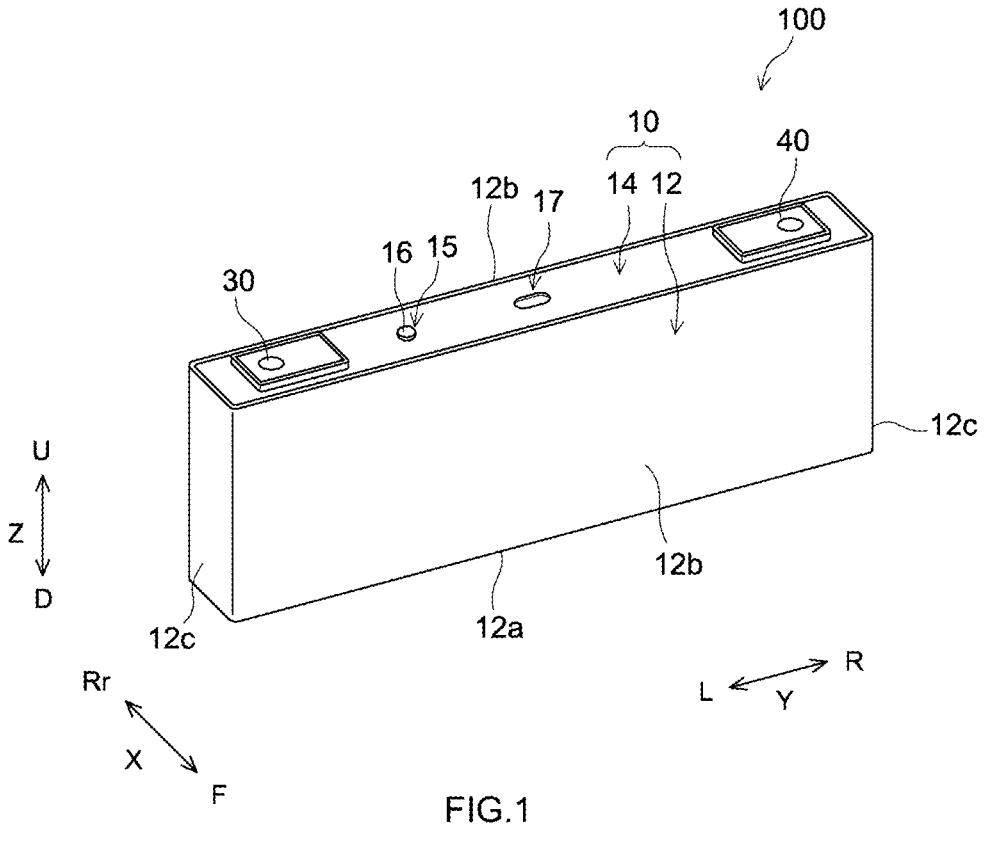
FIG. 1 is a perspective view schematically showing a secondary battery manufactured by the manufacturing method according to an embodiment.

FIG. 1 shows an example of a secondary battery obtained by implementing the manufacturing method disclosed herein. FIG. 1 is a perspective view schematically showing a secondary battery manufactured by the manufacturing method according to one embodiment. A secondary battery 100 includes an electrode body and an electrolyte (electrolytic solution) (not shown), and a battery case 10 that accommodates the electrode body and the electrolyte. The secondary battery 100 is herein a lithium ion secondary battery. As the electrolyte, those that can be used in this kind of secondary battery can be used without particular limitation, and the technique disclosed herein is not characterized thereby, so detailed description thereof will be omitted.

The battery case 10 includes a case body 12 having an opening and a lid 14 that closes the opening. The battery case 10 is integrated and airtightly sealed (hermetically closed) by joining the lid 14 to the peripheral edge of the opening of the case body 12. The lid 14 is provided with a liquid injection hole 15, a safety valve 17, a positive electrode external terminal 30, and a negative electrode external terminal 40. The liquid injection hole 15 is a hole for injecting an electrolytic solution into the battery case 10, and is sealed by a sealing plug 16. The safety valve 17 is a thin-walled portion configured to break and release the gas inside the battery case 10 to the outside when the pressure inside the battery case 10 exceeds a predetermined value. The positive electrode external terminal 30 and the negative electrode external terminal 40 are electrically connected to the electrode body accommodated in the battery case 10.

The battery case 10 is formed in a hexagonal box shape having a pair of rectangular wide surfaces 12b and four rectangular side surfaces between the pair of wide surfaces 12b. The battery case 10 has a pair of rectangular wide surfaces 12b, a rectangular bottom surface 12a, and a pair of rectangular narrow surfaces 12c. That is, in FIG. 1, three of the four rectangular side surfaces are composed of the bottom surface 12a and the pair of narrow surfaces 12c, and the remaining rectangular side surface is composed of a lid 14.

The battery case 10 is made of, for example, a metal. Examples of the metal material constituting the battery case 10 include aluminum, aluminum alloy, iron, iron alloy and the like. Alternatively, the battery case 10 may be made of a heat-resistant resin material such as a polyimide resin.

Figure 2:
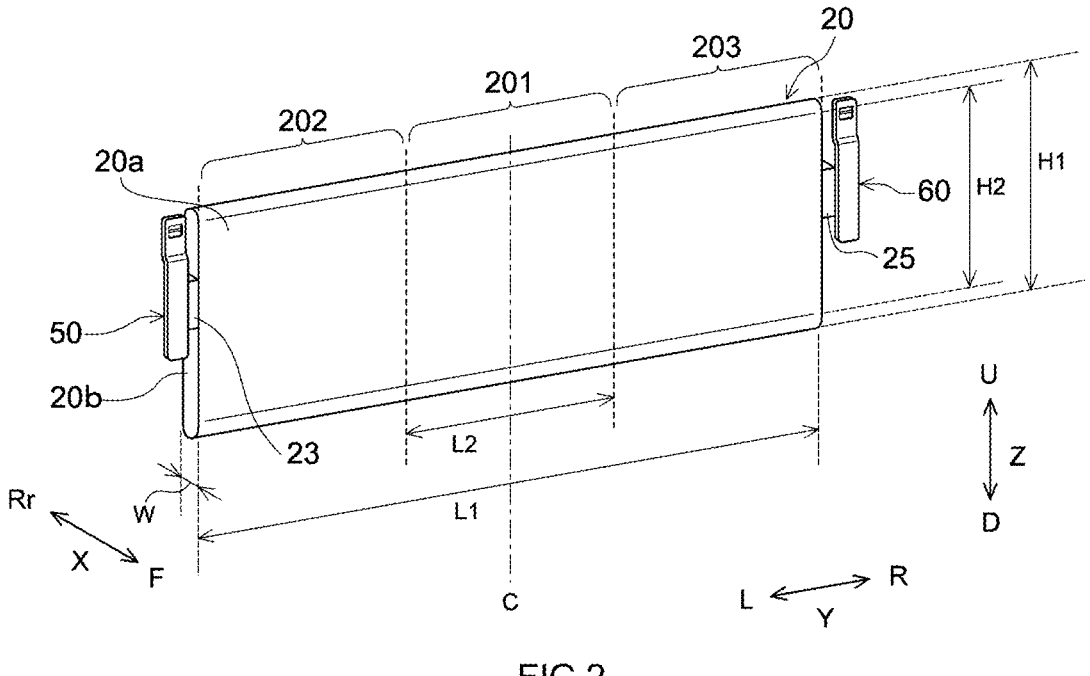
FIG. 2 is a perspective view schematically showing an electrode body used in the manufacturing method according to the embodiment.
Figure 3:
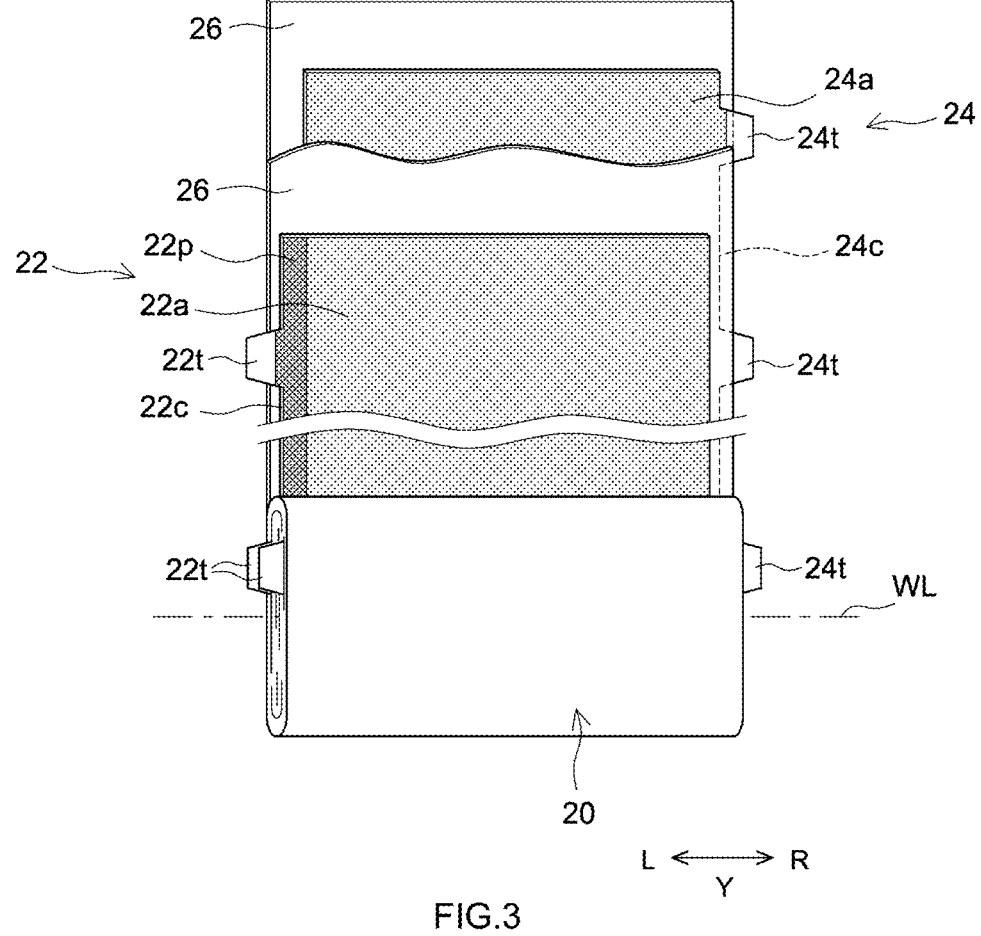
FIG. 3 is a schematic view showing the configuration of the electrode body used in the manufacturing method according to the embodiment.

The electrode body is a power generation element of the secondary battery 100 and includes a positive electrode, a negative electrode, and a separator that separates the positive electrode from the negative electrode. FIG. 2 is a perspective view schematically showing an electrode body used in the manufacturing method according to the embodiment. FIG. 3 is a schematic view showing the configuration of the electrode body used in the manufacturing method according to the embodiment. As shown in FIGS. 2 and 3, a positive electrode internal terminal 50 and a negative electrode internal terminal 60 are attached to the electrode body 20. The positive electrode internal terminal 50 is connected to the positive electrode external terminal 30 (see FIG. 1). The negative electrode internal terminal 60 is connected to the negative electrode external terminal 40 (see FIG. 1).

As shown in FIG. 3, the electrode body 20 has a positive electrode 22 and a negative electrode 24. Here, the electrode body 20 is a flat-shaped wound electrode body obtained by laminating a long strip-shaped positive electrode sheet 22 and a long strip-shaped negative electrode sheet with a long strip-shaped separator 26 interposed therebetween, and winding the laminate around a winding axis WL orthogonal to the sheet longitudinal direction. As shown in FIG. 2, the electrode body 20 has a pair of rectangular surfaces 20a and a pair of end surfaces 20b in the width direction Y. The end surface 20b is a laminated surface of the positive electrode 22, the negative electrode 24, and the separator 26, and is open to the outside of the electrode body 20.

Although detailed illustration is omitted, the electrode body 20 is arranged inside an exterior body 12 in a direction such that the winding axis WL is parallel to the width direction Y. In the state of being accommodated in the battery case 10 shown in FIG. 1, the pair of rectangular surfaces 20a of the electrode body 20 face the wide surface 12b of the battery case 10. Further, the pair of end faces 20b face the narrow surface 12c.

The positive electrode sheet 22 has a long strip-shaped positive electrode current collecting foil 22c (for example, an aluminum foil) and a positive electrode active material layer 22a fixedly attached on at least one surface of the positive electrode current collecting foil 22c. Although not particularly limited, a positive electrode protective layer 22p may be provided, if necessary, on one side edge of the positive electrode sheet 22 in the width direction Y. As the material constituting the positive electrode active material layer 22a and the positive electrode protective layer 22p, those used in this kind of secondary batteries can be used without particular limitation, and since the technique disclosed herein is not characterized thereby, detailed description thereof will be omitted.

A plurality of positive electrode tabs 22t is provided at one end (left end in FIG. 3) of the positive electrode current collecting foil 22c in the width direction Y. Each of the plurality of positive electrode tabs 22t projects toward one side (left side in FIG. 3) in the width direction Y. The plurality of positive electrode tabs 22t are provided at intervals (intermittently) along the longitudinal direction of the positive electrode sheet 22. The positive electrode tab 22t is a part of the positive electrode current collecting foil 22c, and is a portion (current collecting foil exposed portion) where the positive electrode active material layer 22a and the positive electrode protective layer 22p of the positive electrode current collecting foil 22c are not formed. The plurality of positive electrode tabs 22t are stacked at one end (left end in FIG. 3) in the width direction Y to form a positive electrode tab group 23. The positive electrode internal terminal 50 is joined to the positive electrode tab group 23.

The negative electrode sheet 24 has a long strip-shaped negative electrode collecting foil 24c (for example, a copper foil) and a negative electrode active material layer 24a fixedly attached on at least one surface of the negative electrode collecting foil 24c. As the material constituting the negative electrode active material layer 24a, those used in this kind of secondary batteries can be used without particular limitation, and since the technique disclosed herein is not characterized thereby, detailed description thereof is omitted.

A plurality of negative electrode tabs 24t is provided at one end (right end in FIG. 3) of the negative electrode current collecting foil 24c in the width direction Y. Each of the plurality of negative electrode tabs 24t projects toward one side (right side in FIG. 3) in the width direction Y. The plurality of negative electrode tabs 24t are provided at intervals (intermittently) along the longitudinal direction of the negative electrode sheet 24. The negative electrode tab 24t is a part of the negative electrode current collecting foil 24c, and is a portion (current collecting foil exposed portion) where the negative electrode active material layer 24a of the negative electrode current collecting foil 24c is not formed. The plurality of negative electrode tabs 24t are stacked at one end (right end in FIG. 3) in the width direction Y to form a negative electrode tab group 25. The negative electrode internal terminal 60 is joined to the negative electrode tab group 25.

The method for manufacturing the secondary battery disclosed herein includes at least the following steps (1) to (3):

(1) Battery assembly production step;
    (2) Gripping step; and
    (3) Drying step.

(1) In the battery assembly production step, the electrode body is accommodated in the battery case to produce a battery assembly. This step may include producing a combined product of the electrode body 20 and the lid 14, accommodating the combined product in the case body 12, and sealing the case body 12. Although there is no intention of limiting this step, first, the electrode body 20 is produced by a conventional well-known method. Next, the positive electrode internal terminal 50 is attached to the positive electrode tab group 23 of the electrode body 20, and the negative electrode internal terminal 60 is further attached to the negative electrode tab group 25 to prepare a combined product (first combined product) of the electrode body and the internal terminal. Next, the first combined product and the lid 14 are integrated to prepare a second combined product. Specifically, for example, the positive electrode external terminal 30 attached in advance to the lid 14, and the positive electrode internal terminal 50 of the first combined product are joined. Similarly, the negative electrode external terminal 40 attached in advance to the lid 14, and the negative electrode internal terminal 60 of the first combined product are joined. As the joining means, for example, ultrasonic joining, resistance welding, laser welding, and the like can be used.

Next, the second combined product is accommodated in the case body 12. Specifically, for example, the electrode body 20 is accommodated in an electrode body holder prepared by bending an insulating resin sheet (for example, made of a polyolefin such as polyethylene (PE)) into a bag shape or a box shape. Then, the electrode body 20 covered with the electrode body holder is inserted into the case body. In this state, the lid 14 is superposed on the opening of the case body 12, and the case body 12 and the lid 14 are welded together. In this way, the case body 12 is sealed to produce a battery assembly. The battery assembly does not contain an electrolytic solution in the battery case 10. The number of electrode bodies 20 accommodated in the battery case 10 is not particularly limited, and may be one or a plurality (two or more).

Figure 4:
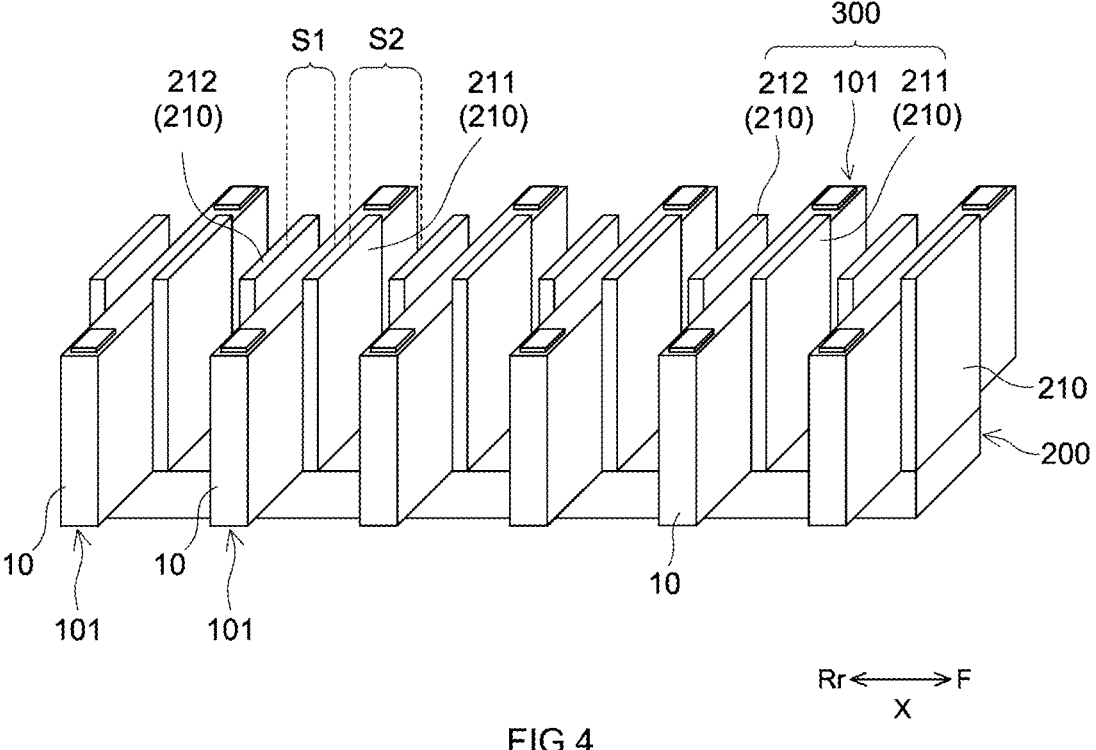
FIG. 4 is a perspective view illustrating a gripping step in the manufacturing method according to the embodiment.

(2) In the gripping step, the battery assembly is gripped using a gripping tool. FIG. 4 is a perspective view illustrating the gripping step in the manufacturing method according to the embodiment. In this step, as shown in FIG. 4, a gripping tool 200 is arranged on the outside of the battery case 10 of the battery assembly 101 so as to sandwich two opposing surfaces of the battery case 10 which are the two surfaces (that is, the wide surfaces 12b) facing the pair of rectangular surfaces 20a (see FIG. 2) of the electrode body 20 accommodated inside the case, thereby gripping the battery assembly 101. The gripping tool 200 has a plurality of gripping plates 210. The plurality of gripping plates 210 are arranged in a predetermined direction (in FIG. 4, the depth direction X of the battery assembly 101). The battery assembly 101 is arranged between two adjacent gripping plates (space S1 between a gripping plate 211 and a gripping plate 212 in FIG. 4) in the depth direction X. In FIG. 4, for convenience of explanation, the gripping plate arranged on the F side of the battery assembly 101 is referred to as the gripping plate 211, and the gripping plate arranged on the Rr side of the battery assembly 101 is referred to as the gripping plate 212. Further, a structure composed of the gripping plate 211, the gripping plate 212, and the battery assembly 101 arranged therebetween is referred to as a grip body 300.

In the present embodiment, a predetermined restraining pressure is applied to each battery assembly 101 by arranging an elastic body (for example, a spring) in a space S2 between two adjacent grip bodies 300. The restraining pressure is set, for example, in the range of 0.5 Mpa to 5 Mpa so as to realize the effect of the technique disclosed herein.

As shown in FIGS. 2 and 4, the gripping plates 210 are arranged so that a larger restraining pressure is applied to a central region 201 (explained in detail hereinbelow) of the electrode body 20 than in other regions of the rectangular surface 20a excluding the central region 201. Here, the "other region" is, for example, a left end region 202 on the left side of the central region 201 and a right end region 203 on the right side of the central region 201 in FIG. 2. As an example, the gripping plate 210 is in contact with the battery case 10 (case body 12) in a region of the wide surface 12b of the case body 12 facing the central region 201 of the electrode body 20 (hereinafter referred to as "region A" for convenience), but is not in contact with the battery case 10 (case body 12) in a region facing the other region (hereinafter referred to as "region B" for convenience). At this time, the restraining pressure from the gripping tool 200 is applied to the region A, but the restraining pressure is not applied to the region B.

As shown in FIG. 2, the central region 201 of the electrode body 20 includes a center line C of the rectangular surface 20$a$ of the electrode body 20 in the long side direction Y (hereinafter, the "width direction Y" is also referred to, as appropriate, as the "long side direction Y"). Here, "includes a center line C" means that the center line C may be included in the central region 201, and is inclusive of both the case where the center line of the region is the center line C and the case where the center line of the region is not the center line C. When the center line of the central region 201 is not the center line C, the distance between the center line of the central region 201 and the center line C may be set to be ¼ L2 or less (the length L2 will be described hereinbelow).

The ratio (L2/L1) of the length L1 of the rectangular surface 20$a$ of the electrode body 20 in the long side direction Y and the length L2 of the central region 201 in the same direction can be, for example, ⅛ or more. From the viewpoint of reducing uneven drying, the ratio is preferably ⅙ or more, and more preferably ¼ or more. The ratio (L2/L1) can be, for example, ½ or less. From the viewpoint of reducing uneven drying, the ratio is preferably ⅖ or less, and more preferably ⅓ or less.

The study conducted by the present inventor made it clear that the larger the length L1 is, the more likely the uneven drying is to occur. The effect of the technique disclosed herein can be preferably realized in the manufacture of a secondary battery having an electrode body having the length L1 of 100 mm or more. Further, even if the length L1 is 200 mm or more, 250 mm or more, or 300 mm or more, the effect of the technique disclosed herein can be preferably realized. The length L1 is not particularly limited, but can be, for example, 1000 mm or less.

(3) In the drying step, the inside of the battery assembly 101 is dried while the battery assembly 101 is gripped and heated. For example, the battery assembly 101 may be heated to a predetermined temperature, and the reached temperature may be maintained for a predetermined time (for example, 10 min to 4 h). The temperature is not particularly limited as long as moisture can be sufficiently removed from the inside of the battery assembly 101, and the temperature may be set to, for example, 100° C. or higher and 150° C. or lower.

As a method for heating the battery assembly 101, for example, a heating element may be used. As the heating element, for example, a conventionally known heating element such as a plate heater or an electric heater may be used. For example, the battery assembly 101 and the heating element are accommodated in the drying chamber, and the inside of the drying chamber is heated to heat the battery assembly 101. In this case, first, the battery assembly 101 in a state of being gripped by the gripping tool 200 is arranged in the drying chamber. The heating element is then switched on to heat the inside of the drying chamber. At this time, it is preferable to heat the inside of the drying chamber until a predetermined temperature is reached, and to maintain the reached temperature for a predetermined time (for example, 10 min to 4 h).

In one embodiment of the technique disclosed herein, a heating element is mounted on the gripping tool 200. Here, "a heating element is mounted" means that the gripping tool 200 and the heating element are integrated, and includes a case where the gripping tool 200 (for example, the gripping plate 210) itself also serves as a heating element. As an example, first, a plate heater is used as a heating element, and the battery assembly 101 in a state of being gripped by the gripping tool 200 is arranged on the plate heater. At this time, the heating element (plate heater) and the gripping tool 200 are integrated. Next, where the switch of the plate heater is turned on and the gripping tool 200 is heated, heat is transferred to the battery assembly 101. At this time, it is preferable to heat the battery assembly 101 until a predetermined temperature is reached, and maintain the reached temperature for a predetermined time (for example, 10 min to 4 h). In this embodiment, a drying chamber may be used and the inside of the drying chamber may be heated as described above.

When using a drying chamber, the pressure inside the drying chamber can be reduced as needed. For example, a vacuum pump is connected to the drying chamber, and the vacuum pump is switched on to depressurize the inside of the drying chamber. It is preferable to reduce the pressure in the drying chamber until the pressure in the drying chamber drops to a predetermined pressure, and maintain the reached pressure for a predetermined time (for example, 1 h to 3 h). The pressure is not particularly limited, and can be, for example, −0.05 MPa or less, −0.08 MPa or less, and −0.09 MPa or less with respect to atmospheric pressure (0.1 MPa), and may be a lower pressure.

When the pressure inside the drying chamber is reduced, the boiling point of water drops. Therefore, when depressurizing the inside of the drying chamber, the heating temperature can be set lower than the above temperature. The temperature in the drying chamber may be 60° C. or higher (for example, 70° C. or higher, 80° C. or higher, 90° C. or higher).

After the drying step, the heating element (for example, a plate heater) is switched off to lower the temperature of the battery assembly 101 (the temperature inside the drying chamber). Further, the pressure inside the drying chamber is reduced, the vacuum pump is switched off to increase the pressure inside the drying chamber until the pressure becomes about the same as the atmospheric pressure.

The battery assembly 101 is taken out of the drying chamber, and an electrolytic solution is injected into the battery case 10 through the injection hole 15 by a conventional well-known method. After that, the liquid injection hole 15 is sealed with a sealing plug 16 to obtain the secondary battery 100. Then, under predetermined conditions, the secondary battery 100 can be put into a usable state by performing initial charging and aging treatment.

Hereinafter, a test example conducted by the present inventor will be described.

Construction of Battery Assembly

NCM as a positive electrode active material, PVdF as a binder, and acetylene black as a conductive material were weighed so as to have mass ratios of 98:1:1 and mixed in N-methyl-2-pyrrolidone (NMP) to prepare a positive electrode slurry. This positive electrode slurry was applied to both sides of a long strip-shaped positive electrode current collector (aluminum foil) and dried. This was cut into a predetermined size and rolled by a roll press to obtain a positive electrode sheet having positive electrode active material layers on both sides of the positive electrode current collector.

Graphite powder as a negative electrode active material, styrene-butadiene rubber as a binder, and carboxymethyl cellulose as a thickener were weighed so as to have mass ratios of 98:1:1 and mixed in water to prepare a negative electrode slurry. This negative electrode slurry was applied to both sides of a long strip-shaped negative electrode current collector (copper foil) and dried. This was cut into a predetermined size and rolled by a roll press to obtain a negative electrode sheet having negative electrode active material layers on both sides of the negative electrode current collector. Next, the produced positive electrode sheet and negative electrode sheet were laminated so as to face each other with a polyethylene separator sheet being interposed therebetween. The laminate was wound in the longitudinal direction of the sheet to produce a wound electrode body as shown in FIG. 2.

Next, an aluminum lead as a positive electrode internal terminal was welded to the positive electrode sheet (positive electrode tab group), and a nickel lead as a negative electrode internal terminal was welded to the negative electrode sheet (negative electrode tab group). The dimensional relationship of the electrode body was as follows:

W: 11.6 mm±0.2 mm;
L1: 332 mm±1.6 mm;
H1: 94 mm±0.25 mm; and
H2: 81 mm.

The reference symbols are as shown in FIG. 2. Specifically, W is the thickness of the electrode body 20. L1 is the width of the electrode body 20. H1 is the height of the electrode body 20. H2 is the height of the rectangular surface 20*a* of the electrode body 20. Further, the above dimensions are average values obtained by producing three electrode bodies.

Next, the electrode body and the lid of the battery case were connected with the positive electrode internal terminal and the negative electrode internal terminal interposed therebetween. This was inserted into the case body, and the case body and the lid were welded together. In this way, a battery assembly for testing was constructed.

Drying the Battery Assembly

Next, the test battery assembly was accommodated in a drying chamber equipped with a plate heater. In the drying chamber, the test battery assembly was placed on the plate heater. Next, the switch of the vacuum pump connected to the drying chamber and the switch of the plate heater were turned on to reduce the pressure in the drying chamber to a predetermined pressure and heat the inside of the drying chamber to a predetermined temperature. Then, the depressurized state and the heated state were maintained for a predetermined time. After the lapse of the predetermined time, the vacuum pump switch and the plate heater switch were turned off to increase the pressure and cool the inside of the drying chamber. The test battery assembly was then removed from the drying chamber. In this test example, the test battery assembly was not gripped using the gripping tool.

Moisture Measurement

The amount of moisture in the test battery assembly before and after drying was measured to evaluate the dry state in the test battery assembly. Specifically, first, a 2 cm×2 cm test piece was cut out from the positive electrode sheet of the test battery assembly before and after drying in the dry room. Regarding the preparation of the test piece, the rectangular surface 20*a* of the electrode body 20 was divided into three regions (left end region 202, central region 201, and right end region 203) in the long side direction Y (see FIG. 2), and three test pieces were cut out from each region. The lengths of the three regions in the same direction were ⅓ L1.

Next, the amount of moisture in the above test pieces was measured using a Karl Fischer moisture measuring device. The heating temperature at the time of measurement was 150° C. By comparing the amount of moisture before and after drying in each region, it was confirmed that a certain amount of moisture was removed from the electrode body by drying. In the "Remaining amount of moisture" column of Table 1, a relative value of the remaining amount of moisture in each region (that is, the amount of moisture after drying) is shown by taking the remaining amount of moisture in the right end region as 1. The numerical values shown in Table 1 were calculated using the average values obtained by using the measured values of the three test pieces cut out from each of the above regions.

TABLE 1

| Measurement region | Remaining amount of moisture |
|---|---|
| Left end region | 1 |
| Central region | 1.2 |
| Right end region | 1 |

From the results shown in Table 1, the remaining amount of moisture in the central region of the electrode body after drying was larger than that in the other regions (that is, the end regions) other than the central region. That is, it was found that the electrode body of the test battery assembly had uneven drying.

In the manufacturing method disclosed here, a battery assembly 101 was produced, and a gripping tool 200 was arranged on the outside of the battery case 10 of the battery assembly 101 so as to sandwich two opposing surfaces of the battery case 10 which are the two surfaces facing the pair of rectangular surfaces 20*a* of the electrode body 20 accommodated inside the case, thereby gripping the battery assembly 101. In this way, the battery assembly 101 was gripped and heated, and the battery assembly 101 was dried. Here, in the gripping, a larger restraining pressure is applied to the central region 201 including the center line C in a long side direction Y of the rectangular surface 20*a* of the electrode body 20 than to other regions (for example, end regions 202 and 203) of the rectangular surface excluding the central region. By gripping the central region 201 with the gripping tool 200, the heat transfer efficiency to the region can be increased. Therefore, it is possible to promote the removal of moisture from the region and suppress the occurrence of uneven drying in the electrode body 20.

Regarding the drying of the wound electrode body, the moisture in the wound electrode body is removed from the laminated surfaces of the electrode body (end surfaces 20*b* in FIG. 2) open to the outside. In the wound electrode body, as shown in the example of study conducted by the present inventor, moisture remains in the central region, and uneven drying is likely to occur. By applying the technique disclosed herein to the manufacture of a secondary battery including a wound electrode body, it is possible to suppress the occurrence of uneven drying in the wound electrode body.

The specific examples of the technique disclosed herein have been described in detail hereinabove, but these are merely examples and do not limit the scope of claims. The technique disclosed herein is inclusive of various changes and modifications of the above specific examples. For example, the technique disclosed herein can also be applied to a sodium ion secondary battery. The technique disclosed herein can also be applied to a secondary battery including a laminated electrode body.

In the above embodiment, as shown in FIG. 4, a restraining pressure was applied to the central region 201 of the electrode body 20 by arranging the elastic body between two adjacent grip bodies 300 (that is, in the space S2). However, such an embodiment is not limiting. For example, the elastic body may not be arranged in the space S2, and the battery assembly 101 may be arranged in the same manner as in the space S1. In this state, the gripping plates 210 located at the ends on the F side and the Rr side of the gripping tool 200 may be bridged with a band or the like in the arrangement direction of the battery assembly 101 (direction X in FIG. 4). Alternatively, restraining jigs such as screws may be provided to the gripping plates 210 at the ends, and the restraining pressure may be applied to the central region 201 of the electrode body 20 by tightening the restraining jigs.

In the above embodiment, the gripping plate 210 is arranged so as to face only the central region 201 of the electrode body 20, and the gripping plate 210 does not face other regions (for example, end regions 202 and 203). However, this embodiment is not limiting. For example, a gripping plate facing the entire rectangular surface 20a of the electrode body 20 can be used. Such a gripping plate may be provided, for example, with a protrusion only in a portion facing the central region 201. With such a protrusion, the restraining pressure applied to the central region 201 can be selectively increased.

In the above embodiment, the planar shape of the gripping plate 210 is rectangular, but this embodiment is not limiting. It suffices for the gripping plate to be in contact with the region A to the extent that the effect of the technique disclosed herein can be realized. When the area of the region A (that is, the area of the central region 201) is 100%, the contact area between the gripping plate 210 and the region A can be 40% or more, for example, 50% or more, preferably 60% or more, more preferably 70% or more, still more preferably 80% or more, and the closer to 100% (for example, 90% or more, or 95% or more) the better.

What is claimed is:

1. A method for manufacturing a secondary battery comprising an electrode body that comprises a positive electrode, a negative electrode, and a separator that separates the positive electrode and the negative electrode, and comprises at least a pair of rectangular surfaces, and a battery case that accommodates the electrode body, the method comprising the steps of:

accommodating the electrode body in the battery case to produce a battery assembly;

arranging a gripping tool on the outside of the battery case of the battery assembly and gripping the battery assembly with the gripping tool, wherein the battery case comprises two facing surfaces facing the pair of rectangular surfaces of the electrode body accommodated inside the case, and the two facing surfaces of the battery case are sandwiched with the gripping tool;

drying the inside of the battery assembly, wherein the battery assembly is gripped and heated at 60° C. or higher and 150° C. or lower, after the drying, injecting an electrolytic solution to the battery case through an injection hole on the battery case;

after the injecting, sealing the injection hole; and after the sealing, performing an initial charging and an aging treatment, wherein in the gripping, a larger restraining pressure is applied to a central region including a center line in a long side direction of the rectangular surface of the electrode body than to other regions of the rectangular surface excluding the central region, the ratio (L2/L1) of the length L2 in the long side direction of the central region to the length L1 in the long side direction of the rectangular surface of the electrode body is ⅛ or more and ½ or less, the gripping tool has gripping plates arranged in a direction, and a plate heater on which the gripping plates are arranged outside, in the gripping, a plurality of the battery assembly are prepared, each of the plurality of the battery assembly is arranged between two adjacent gripping plates in the direction where the gripping plates are arranged to form grip bodies, wherein each of the grip bodies is composed of the two adjacent gripping plates and the battery assembly arranged therebetween, the grip bodies are arranged on the plate heater, an elastic body is arranged in a space between two adjacent grip bodies to apply a restraining pressure to each of the plurality of the battery assembly.

2. The manufacturing method according to claim 1, wherein the ratio (L2/L1) of the length L2 in the long side direction of the central region to the length L1 in the long side direction of the rectangular surface of the electrode body is ¼ or more and ⅓ or less.

3. The manufacturing method according to claim 1, wherein the length L1 is 100 mm or more and 1000 mm or less.

4. The manufacturing method according to claim 1, wherein the positive electrode is a long strip-shaped positive electrode sheet;

the negative electrode is a long strip-shaped negative electrode sheet; and the electrode body is a wound electrode body in which the positive electrode sheet and the negative electrode sheet are laminated with the separator interposed therebetween and are wound around a winding axis orthogonal to the longitudinal direction of the sheets, wherein the laminated surfaces of the positive electrode sheet, the negative electrode sheet, and the separator are open to the outside of the electrode body from both ends in the winding axis direction.

5. The manufacturing method according to claim 1, wherein the gripping plates are in contact with the battery case in a region facing the central region and are not in contact with the battery case in a region facing the other region.

6. The manufacturing method according to claim 1, wherein in the drying, the plurality of the battery assembly, the gripping tool, and the plate heater are accommodated in a drying chamber, and a pressure inside the drying chamber is reduced.

7. The manufacturing method according to claim 1, wherein the elastic body is a spring.

8. The manufacturing method according to claim 5, wherein the elastic body is a spring.

9. The manufacturing method according to claim 1, wherein each of the gripping plates entirely faces the rectangular surface of the electrode body, and has a protrusion only in a portion facing the central region.

10. The manufacturing method according to claim 9, wherein the elastic body is a spring.

* * * * *